UNITED STATES PATENT OFFICE.

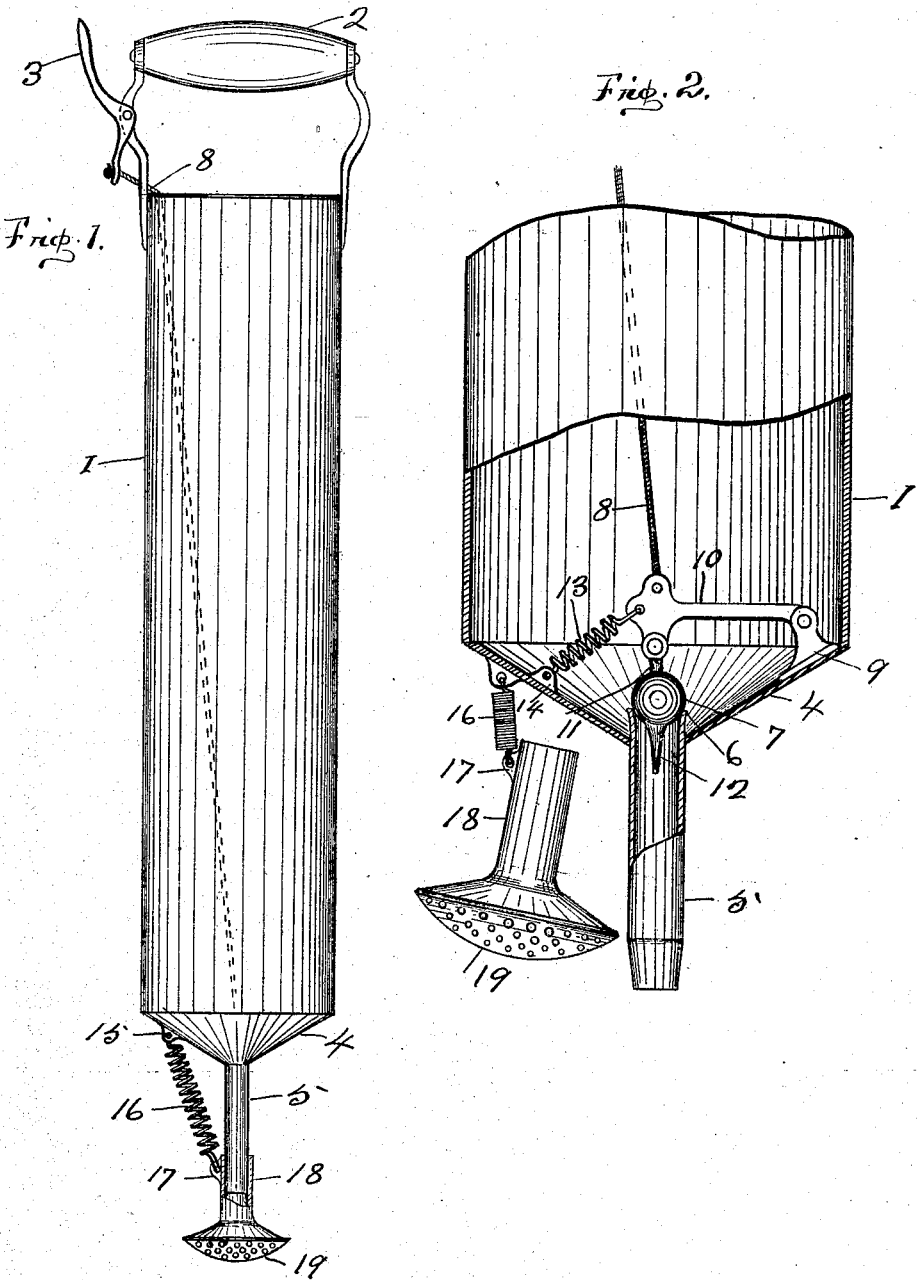

EDWIN R. RICHARDS, OF LAND, INDIANA, ASSIGNOR OF ONE-HALF TO JOSEPH V. VINCENT, OF COLUMBIA CITY, INDIANA.

HAND-SPRAYER.

No. 905,102.  Specification of Letters Patent.  Patented Nov. 24, 1908.

Application filed June 13, 1906. Serial No. 321,454.

*To all whom it may concern:*

Be it known that I, EDWIN R. RICHARDS, a citizen of the United States, residing at Land, in the county of Whitley, in the State of Indiana, have invented certain new and useful Improvements in Hand-Sprayers; and I do hereby declare that the following is a full, clear, and exact description of the invention, which will enable others skilled in the art to which it appertains to make and use the same, reference being had to the accompanying drawings, which form part of this specification.

My invention relates to improvements in hand sprayers.

The object of my present invention is to provide a comparatively cheap, simple, convenient and efficient hand spraying and sprinkling device specially designed and adapted for the spraying of insect infested plants or shrubs, for sprinkling floors, for watering small plants by distributing thereto without waste a limited quantity of water, and also for use by druggists and physicians in measuring water by drops in the preparation of prescriptions and compounds.

My invention consists of a portable cylindrical reservoir receptacle having a valve controlled discharge orifice at its bottom; a removable liquid spraying nozzle for the orifice; and means for opening and closing the valve at pleasure operative from the upper end of the receptacle.

The principal novel feature of my invention resides in the general combination of the operative parts which adapts it for its special functions.

Similar reference numerals indicate like parts throughout the several views of the drawings in which Figure 1, is a view in elevation of my invention showing the general arrangement of the operative parts with the detachable spray nozzle in position for use. Fig. 2 is an enlarged detail of the lower end of the reservoir receptacle, partly in vertical section to show the valve operating mechanism, and also showing the arrangement of the spray nozzle when not in use.

The reservoir receptacle 1, preferably cylindrical in contour, and of any desired proportions and dimensions and capacity and of any proper material, though preferably a non-corrosive sheet-metal, has a diametrically pivoted handle 2 to one side of which is pivotally mounted a bell-crank thumb-lever 3 for the purpose hereafter described.

The lower end of the reservoir receptacle 1 is closed by a tapering bottom 4 having a comparatively short central pendent discharge tube 5 whose upper end is provided with a valve seat 6, and is normally closed by a vertically movable ball valve 7 whose upper end is operatively connected with the inner end of the lever 3 by means of a wire, cord, or cable 8. This valve 7 is provided upon its lower face with a pendent guiding lug 12 that projects within the upper end of the tube 5, and is thereby adapted to prevent derangement of the valve from its seat when in use.

In the upright lug 9 on the inner face of the bottom 4 is pivotally fulcrumed one end of the horizontally arranged lever 10 whose enlarged other end is pivotally connected to the upper portion of the valve 7 by means of the lug 11, or other proper manner. This valve preferably ball shaped is normally held firmly upon its seat 6 by means of a proper coiled spring 13 of proper tension having one end thereof secured to the said enlarged end of the lever 10 and the other end to a lug 14 on the bottom 4, whereby the valve is lifted from its seat against the tension of this spring.

The lower end of the cord, wire, or cable 8 is secured to the inner enlarged end of the lever 10.

At a suitable point on outer face of the bottom 4 is arranged a perforated lug 15 to which is loosely secured the upper end of a pendent coil spring 16 whose lower end is secured to a perforated lug 17 on the upper end of the spray nozzle 18 having a convex perforated head 19, Fig. 2. This nozzle is adapted to be removably mounted on the free end of the discharge tube 5.

It is to be observed that the pivoted end of the lever 10 is sufficiently remote from the seat of the valve 7 to permit the enlarged free end of said lever to lie immediately above the upper end of the discharge tube 5, and said free end of the lever 10 is provided with a plurality of perforated ears arranged one at the upper side and one at the lower side of the lever, and one intermediate said upper and lower ears. The wire, cord or cable 8 is connected to the upper ear; the valve 7 to the lower ear, and the spring 13 is connected to the intermediate ear. Thus the actuation of the lever and the valve, both in seating and unseating the latter, is rendered positive and effectual.

The operation and manner of employing my invention thus described is obvious and briefly stated is as follows: Assuming the spray nozzle 18 to be in position for use as shown in Fig. 1, the operator fills the reservoir tank 1 from the open top with the desired liquid, and conveniently carries it by the handle 2 by which he readily holds it above the plants or shrubs to be sprayed. He then regulates the discharge of the liquid contents at pleasure by means of the thumb lever 3, pressure on the upper end of which raises the valve 7 from the seat through the medium of the cable 8 and the lever 10 against the tension of the coil spring 13 which automatically returns the valve to its seat when pressure on the lever 3 is removed, being guided thereto by the lug 12.

Obviously my invention can be employed in the same manner for the sprinkling of floors and like purposes.

When it is desired to employ my invention for watering small plants and flowers, the operator removes the nozzle 18, and by proper minpulation of the valve 7 he can readily discharge the desired quantity of liquid without waste, at any desired intervals. In like manner my invention can be employed by druggists and physicians for measuring water by drops for prescriptions, it being obvious that it is only necessary to exercise care in moving the valve 7 from its seat, the liquid discharged thereby being thus regulated, and enabling the dropping of the liquid to be effectually done.

It is obvious that the nozzle 18 is firmly secured in its pendent position on the spout 5 by the coil spring 16, as shown in Fig. 1, and that when the nozzle is removed it will be securely retained in close proximity to the tube 5, by the spring 16, as shown in Fig. 2, whereby it is always within convenient reach when its use is desired.

Having thus described my invention and the manner of employing the same, what I claim as my invention and desire to secure by Letters Patent is:

1. A spraying device of the class described, comprising a reservoir having a pendent discharge tube at its lower end, a valve seat arranged at the upper end of said discharge tube, a valve coöperating with said seat for closing the discharge tube, a lever arranged within the reservoir and having one of its ends pivoted therein, the other end of said lever being enlarged and provided with a plurality of perforated ears one of which is arranged at the upper side and one at the lower side of said lever, and one of which is also arranged intermediate said upper and lower ears, said valve being pivotally connected to the lower of said ears, an operating connection engaged with the upper of said ears for actuating said lever, and a spring connected to the intermediate ear for maintaining the valve normally seated.

2. A spraying device of the class described, comprising a reservoir having a pendent discharge tube at its lower end, a valve seat arranged at the upper end of said discharge tube, a valve coöperating with said seat for closing the discharge tube, a lever arranged within the reservoir and having one of its ends pivoted therein, the other end of said lever being enlarged and provided with a plurality of perforated ears one of which is arranged at the upper side and one at the lower side of said lever, and one of which is also arranged intermediate said upper and lower ears, said valve being pivotally connected to the lower of said ears, an operating connection engaged with the upper of said ears for actuating said lever, a spring connected to the intermediate ear for maintaining the valve normally seated, and a thumb lever arranged at the exterior of the reservoir and connected to said operating connection for actuating the latter.

Signed by me at Fort Wayne, Allen county, State of Indiana, this 7th day of June, A. D. 1906.

EDWIN R. RICHARDS.

Witnesses:
 WATTS P. DENNY,
 AUGUSTA VIBERG.